2,900,279

PROCESS FOR MAKING FIRE RETARDANT CELLULOSIC ARTICLES

Robert R. Dreisbach and John L. Lang, Midland, Mich., assignors to The Dow Chemical Company, Midland, Mich., a corporation of Delaware No Drawing. Application October 1, 1954
Serial No. 459,858

4 Claims. (Cl. 117—136)

This invention relates to a process for producing a fire retardant cellulosic article and particularly to a composition exhibiting a reduced tendency to afterglow.

For the purposes of this application, the term cellulosic article means a material comprising natural or regenerated celluloses, or mixtures thereof, and the textiles comprising fibers of such cellulosic materials. By fire retardant is meant a material treated so that it is resistant to the propagation of flame across its surface after the igniting flame has been removed or burns very slowly after the flame has been removed.

Various compounds and compositions have been used or suggested for use as agents for treating cellulosic and other normally flammable organic materials to render them resistant to flame. In U.S. Patent 2,574,518 the use of brominated dialkene amido phosphates has been discloed. Also, in U.S. Patent 2,305,035 is disclosed the use of alkylolamine guanidines. In U.S. Patent 2,418,525 melamine pyrophosphate is used as a flameproofing agent. The use of polyphosphorylamide is disclosed in U.S. Patent 2,596,936. For a description of further compounds and compositions reference may be made to Little, "Flameproofing Textile Fabrics," Reinhold Publishing Corporation, New York, (1947).

The compositions or treatments that are used in textile fabrics to make such fabrics resistant to flame may be classified generally into two groups; (1) temporary or non-durable, in which the fire retarding agent is removed by washing, and (2) durable, in which the fire retarding agent is not removed by washing.

The compounds that have been used in the past to give a durable fire retardant treatment to cellulosic materials have suffered from the disadvantage that after treatment the fibers become hard and brittle and normally soft and flexible articles could not be folded. Also, such compounds in many cases tend to weaken the fiber so as to limit its usefulness. In addition, many such compounds prohibitively increased the cost of the articles.

It is accordingly an object of this invention to provide a fire retardant cellulosic material.

It is a further object to provide a process for making a fire retardant composition of the durable class that will not alter the desirable characteristics, such as softness and tensile strength, of cellulosic materials.

It is a still further object to provide such a fire retardant treatment that will not appreciably increase the cost of the cellulosic article.

The above and related objects are accomplished by a process consisting of immersing the cellulosic material in an aqueous solution consisting of the reaction product of a alkylene polyamine with an acid from the group consisting of phosphoric acid and boric acid, insolubilizing the reaction product by further reaction with an organic acid such as acetic acid, oxalic acid, or 2,4-dibromosuccinic acid, and subsequently drying the treated article.

Any alkylene polyamine that forms water-soluble boric or phosphoric salts and contains more than one free amino group is suitable for use in this invention. Typical examples of such amines are ethylene or propylene diamine and diethylene or dipropylene triamine. Phosphoric and boric acids are the preferred agents for solubilizing the polyamine since such acids impart a fire retardant effect of their own.

The reactants should preferably be employed at a mole ratio of one part polyamine to one part of acid although a small excess of the amine may be present. With such a ratio there are functional groups remaining on the amine salt formed which may be further reacted with organic acids, after the water-soluble material is deposited on the cellulosic article, to insolubilize the compound, to cross link, to introduce halogen atoms, or to modify the compound in many other ways. Acetic acid may be used to insolubilize the compound; oxalic acid to cross link two molecules; and dibromosuccinic acid may be used to crosslink the amine salt and to introduce halogen atoms. When such subsequent reactions are carried out the organic acid should be used in a mole ratio of one to one with the amine salt.

It has been determined that to render the treated article both self-extinguishing and non-afterglowing, the fire retarding agent must be present in an amount sufficient to provide at least 3 percent phosphoric or boric acid, based on the weight of cellulose. Lesser amounts down to 1.5 percent equivalent of the acid may be incorporated and in such cases the treated article will burn but when extinguished will exhibit no afterglow. When bromine compounds are used together with the phosphorus compounds there should be at least 9 percent bromine in the treated article to render it self-extinguishing. When at least 9 percent bromine and 1.5 percent phosphoric acid are present, the treated article is both self-extinguishing and exhibits no afterglow.

The cellulosic article may be impregnated by any suitable method. The most convenient method is to simply immerse the fabric in the solution containing the polyamine and inorganic acid until it is thoroughly soaked and to allow it to drain dry after which it may be immersed in a solution of the organic acid, and finally air dried.

The temperature at which all of the impregnating steps of this invention should be carried out should be below 50° C., and preferably at about room temperature. When higher temperatures are employed with phosphoric salts of polyamines, the phosphoric acid and the amine may react to form an insoluble phosphoramide. The fibers may also be weakened by using higher temperatures. Cellulosic articles treated according to the method of this invention are rendered permanently fire retardant. Such treated articles may be repeatedly dry-cleaned or laundered without any appreciable loss in fire retardant properties. A most desirable feature of the invention is that the hand of the cellulosic article is not adversely affected. This is in sharp contrast with the previous treatments which formed treated articles that were stiff, cold, or had an otherwise undesirable hand. The strength of the articles treated according to this invention is not lowered significantly.

The process of the invention will be more apparent from the following illustrative examples in which all parts are by weight.

Example 1

A 24 percent by weight solution of the reaction product of one mole of diethylene triamine and one mole of phosphoric acid in water was prepared. A sheet of number 140 cotton sheeting was immersed in the solution, removed, and allowed to drain dry. The damp sheeting was then immersed in an aqueous acetic acid solution and dried. After air drying, the treated cloth was exposed to a flame. The sheet was self-extinguishing and showed no afterglow.

Example 2

A 25 percent aqueous solution of 1 mole diethylene triamine, 1 mole phosphoric acid, and 1 mole dibromosuccinic acid was prepared. A piece of No. 140 cotton sheeting was immersed in the solution and drained as in Example 1. The sheeting was then immersed in an aqueous oxalic acid solution and dried. When subjected to the flame it was found to be self-extinguishing and exhibited no afterglow. The treated piece of cloth was dry-cleaned and again presented to the flame. It was still self-extinguishing and had no afterglow.

In a like manner, a different piece of the same cotton sheeting was immersed in the same solution, followed by immersion in an aqueous solution of alkaline earth salts and finally air dried. When subjected to the flame test, this material was found to be self-extinguishing and had no afterglow. It was also found to be capable of being dry-cleaned and washed without losing these properties.

Example 3

Three moles of ethylene diamine were slowly added to 25 percent aqueous solution containing 2 moles of orthophosphoric acid. The solution was concentrated by distillation of part of the water until a 10 percent aqueous solution of the reaction product remained. A piece of No. 140 cotton sheeting was dipped into this solution for 5 minutes, allowed to drain. The sheeting was then immersed in an aqueous solution of 2,3-dibromosuccinic acid and dried. When this article was exposed to a flame, it was found to be self-extinguishing and showed no afterglow. After being dry-cleaned four times in perchloroethylene, it was still self-extinguishing and had no afterglow. By way of contrast, when diethanolamine was used in place of the ethylene diamine in a similar treatment, the cotton cloth burned.

Example 4

The processes described in Examples 1 to 3 were repeated using boric acid in place of phosphoric acid. When the dried samples of sheeting were exposed to a flame, they were found to be self-extinguishing when the flame was removed and exhibited no afterglow. These properties were retained after several launderings.

We claimed:

1. The process of rendering a normally flammable cellulosic article fire retardant consisting of (1) immersing the cellulosic article in an aqueous solution of the amine salt formed by the reaction of an alkylene polyamine containing at least two free amino groups and about equimolar proportions of an acid from the group consisting of phosphoric and boric acids, (2) immersing the said cellulosic article in a second solution of an organic aliphatic carboxylic acid having not more than 4 carbon atoms to insolubilize said amine salt, each of said steps (1) and (2) being carried out at a temperature below 50° C. and (3) drying the so-treated article.

2. The process claimed in claim 1 in which the organic acid is acetic acid.

3. The process claimed in claim 1 in which the organic acid is oxalic acid.

4. The process claim in claim 1 in which the organic acid is 2,3-dibromosuccinic acid.

References Cited in the file of this patent

UNITED STATES PATENTS

| | | |
|---|---|---|
| 2,185,480 | Ulrich et al. | Jan. 2, 1940 |
| 2,286,726 | Gordon | June 16, 1942 |
| 2,366,129 | Rust | Dec. 26, 1944 |
| 2,408,332 | Morgan | Sept. 24, 1946 |
| 2,433,680 | Backman | Dec. 30, 1947 |
| 2,460,998 | Nelson | Feb. 8, 1949 |
| 2,684,305 | Quinlivan | July 20, 1954 |